US006877166B1

(12) United States Patent
Roeck et al.

(10) Patent No.: US 6,877,166 B1
(45) Date of Patent: Apr. 5, 2005

(54) INTELLIGENT POWER LEVEL ADJUSTMENT FOR CABLE MODEMS IN PRESENCE OF NOISE

(75) Inventors: Guenter E. Roeck, San Jose, CA (US); Mark E. Millet, Mountain View, CA (US); Son D. Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/484,610

(22) Filed: Jan. 18, 2000

(51) Int. Cl.[7] .............................................. H04N 7/173
(52) U.S. Cl. ...................... 725/111; 725/107; 725/121; 725/124; 725/125; 725/127; 725/130; 455/68; 455/522
(58) Field of Search ................................ 725/111, 121, 725/124, 125, 127, 128, 130; 455/68–72, 522, 67, 456.1–456.6

(56) References Cited

U.S. PATENT DOCUMENTS

| | | | | | |
|---|---|---|---|---|---|
| 4,512,033 | A | * | 4/1985 | Schrock ...................... | 725/107 |
| 5,142,690 | A | * | 8/1992 | McMullan et al. ......... | 725/124 |
| 5,225,902 | A | | 7/1993 | McMullan, Jr. ............. | 358/86 |
| 5,606,725 | A | * | 2/1997 | Hart ............................ | 725/131 |
| 5,710,982 | A | * | 1/1998 | Laborde et al. ............... | 455/69 |
| 5,729,824 | A | | 3/1998 | O'Neill et al. ............... | 455/3.1 |
| 5,790,523 | A | | 8/1998 | Ritchie, Jr. et al. ......... | 370/241 |
| 5,790,533 | A | * | 8/1998 | Burke et al. ................ | 370/318 |
| 5,862,451 | A | | 1/1999 | Grau et al. ................... | 455/5.1 |
| 5,943,604 | A | | 8/1999 | Chen et al. .................. | 455/5.1 |
| 6,032,019 | A | * | 2/2000 | Chen et al. .................. | 725/124 |
| 6,035,209 | A | * | 3/2000 | Tiedemann et al. ......... | 455/522 |
| 6,111,887 | A | * | 8/2000 | Daily et al. ................. | 370/449 |
| 6,212,399 | B1 | * | 4/2001 | Kumar et al. ............... | 455/522 |
| 6,285,960 | B1 | * | 9/2001 | Fung et al. .................. | 702/107 |
| 6,360,369 | B1 | * | 3/2002 | Mahoney ..................... | 725/111 |
| 6,385,773 | B1 | * | 5/2002 | Schwartzman et al. ..... | 725/124 |
| 6,453,472 | B1 | * | 9/2002 | Leano et al. ................. | 725/111 |
| 6,519,449 | B1 | * | 2/2003 | Zhang et al. ................. | 455/69 |
| 6,650,624 | B1 | * | 11/2003 | Quigley et al. ............. | 370/252 |
| 6,735,221 | B1 | * | 5/2004 | Cherubini .................... | 370/485 |
| 2001/0055319 | A1 | * | 12/2001 | Quigley et al. | |

OTHER PUBLICATIONS

U.S. Appl. No. 09/396,303, filed Sep. 15, 1999, Alejandro H. Schwartzman, et al., "Method and Apparatus for Reducing Noise Leakage From a Cable Modem", 35 Pages.

U.S. Appl. No. 09/344,037, filed Jun. 26, 1999, Alejandro H. Schwartzman, et al., "Method and Apparatus for Reducing Noise Leakage From a Cable Modem," 35 Pages.

Website printout from www.anadigics.com, entitled ANA-DIGICS Reverse Amplifier Drives Internet Enabled CATV Systems, 2 pages.

(Continued)

*Primary Examiner*—John Miller
*Assistant Examiner*—Annan Q Shang
(74) *Attorney, Agent, or Firm*—Beyer Weaver & Thomas LLP (57) ABSTRACT

A technique is disclosed for selectively adjusting the power and/or frequency of cable modems without relying solely on the most recent measurement of these values to determine whether a change is necessary. Rather, it considers multiple recent measurements and from these makes its assessment. In one approach, the technique employs an average of the recent measurements to determine whether a change in power or frequency is necessary. There are actually at least three determinations that can make use of multiple recent measurements. These include (1) determining whether the signals are fluctuating to an extent that requires a special adjustment technique, (2) determining whether an adjustment is necessary (using the special technique), and (3) determining how large of an adjustment is necessary.

42 Claims, 6 Drawing Sheets

OTHER PUBLICATIONS

Production Description for ARA1400S12 CATV Reverse Amplifier with Step Attenuator Advanced Product Information, Rev. 1, by ANADIGICS, 8 pages.

U.S. Appl. No. 08/933,334, filed Dec. 19, 1997, Charles J. Naegeli et al., "Method and Apparatus for Using a Spectrum Analyzer For Locating Ingress Noise Gaps", 43 Pages.

Wavetek®, "RP100 Return Path Monitoring System," *Product Brochure*, (1997).

ANSI®, "Carrier–to–Customer Installation—DS1 Metallic Interface", *American National Standard for Telecommunications*, T1.403 (1989).

Rogers Engineering, "Two–Way CATV Plant Characterization Test Procedures" *Test Procedures for Two–Way CATV Plant Characterization*, p. 8 (1993).

R.P.C. Wolters, "Characteristics of Upstream Channel Noise in CATV–Networks", *IEEE Transactions on Broadcasting*, vol. 42, No. 4, pp. 328–332 (1996).

Ulm, et al., "Data–Over–Cable Service Interface Specification", *Radio Frequency Interface Specification, No. 102–971008*, (1997).

U.S. Appl. No. 09/608,202, filed Jun. 30, 2000, Harihara Mahesh et al., "Dynamic Modulation of Modulation Profiles for Communication Channels in an Access Network", 43 Pages.

U.S. Appl. No. 09/325,534, filed Jun. 3, 1999, Charles J. Naegeli, et al., "Method and Apparatus for Measuring Quality of Upstream Signal Transmission of a Cable Modem", 45 Pages.

U.S. Appl. No. 09/227,991, filed Jan. 8, 1999, Charles J. Naegeli, et al., "Method and Appratus for Locating a Cleaner Bandwidth in a Frequency Channel for Data Transmission", 46 Pages.

AD9071, Product Specification, Analog Devices, Inc., 1999, 12 Pages, One Technology Way, Norwood, MA 02062, http://www.analog.com.

U.S. Appl. No. 09/234,775, filed Jan. 20, 1999, Wei–Sing Chen, et al., "Echo Device Method for Locating Upstream Ingress Noise Gaps at Cable Television Head Ends", 31 Pages.

U.S. Appl. No. 08/962,231, filed Oct. 31, 1997, Wei–Sing Chen, et al., "Echo Device Method for Locating Upstream Ingress Noise Gaps at Cable Television Head Ends", 31 Pages.

* cited by examiner

| Signal/Noise | Power Level Adjustment |
|---|---|
| 24.00 dB | 0 dBmV |
| 23.24 dB | - 0.5 dBmV |
| 21.74 dB | - 1.5 dBmV |
| 20.38 dB | - 2.4 dBmV |
| 19.17 dB | - 3.2 dBmV |
| 18.11 dB | - 3.9 dBmV |
| 17.21 dB | - 4.5 dBmV |
| 16.45 dB | - 5.0 dBmV |
| 16.00 dB | - 5.3 dBmV |

INTELLIGENT POWER LEVEL ADJUSTMENT FOR CABLE MODEMS IN PRESENCE OF NOISE

BACKGROUND OF THE INVENTION

This invention relates to systems and methods for adjusting cable modem power and frequency levels when noise is present in the cable network. More specifically, the invention relates to cable network systems that calculate power and/or frequency adjustments based upon an average (or some other statistical measure) of recently measured power and frequency levels.

In cable network systems (e.g., hybrid fiber-coaxial (or HFC) plants), digital data is carried over radio frequency (RF) carrier signals. At the interfaces of a cable network are cable modems. These devices modulate digital data for "upstream" transmission on a broadband media and demodulate modulated RF signals for "downstream" reception of digital data.

Most cable networks are designed so that the head-end (or the cable modem termination system (CMTS) component of the head-end) receives communications from cable modems at some baseline power level (e.g., 0 decibels). The CMTS, and hence the cable network, will not perform properly if upstream signals from cable modems deviate significantly from this expected baseline power. Due to cable network topology, different cable modems must send upstream signals at different power levels. This situation may be better understood with reference to FIG. 1.

Figure 1:
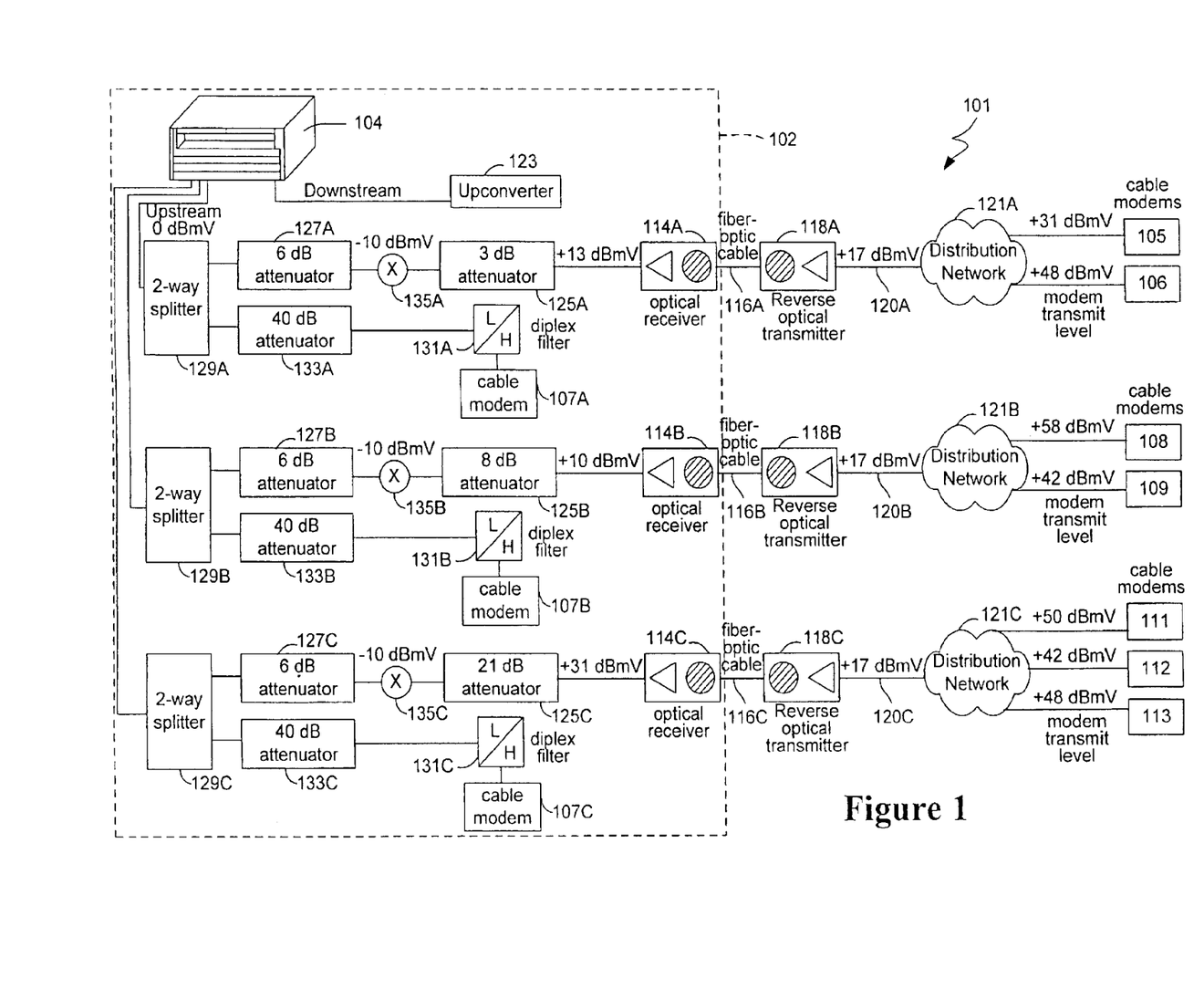
FIG. 1 is a diagram depicting a cable modem network including a cable modem termination system and several cable modems.

FIG. 1 is a block diagram of the upstream components of a two-way HFC cable system 101. The system includes various cable modems and a CMTS 104. Note that the depicted system includes three separate distribution networks 121A–C connected to three different upstream ports of CMTS 104.

The described HFC cable system may be used for two-way transmission of digital data such as Internet data, digital audio, or digital video data in MPEG format, for example. The data arrives from one or more external sources (not shown) through CMTS 104. The CMTS converts the digital data from these sources to a modulated RF signal that is carried over the fiber and coaxial lines to the subscriber premises. The cable modems demodulate the RF signal and feed the digital data to computer their respective computers. On the return path, the operations are reversed. The digital data is fed to the cable modem, which converts it to a modulated RF signal. Once the CMTS receives the RF signal, it demodulates it and transmits the digital data to an external source.

The main distribution component of HFC cable system 101 is a hub 102 (also referred to as the "head-end") which can typically service about 40,000 subscribers or end-users. Hub 102 contains several components, most notably CMTS 104. From CMTS 104, separate downstream and upstream lines are used for sending and receiving data. Downstream signals pass through an upconverter 123 and onto other components on their way to destination cable modems. Upconverter 123 converts the frequency at which downstream signals are carried. All data from CMTS 104 is carried in an "intermediate frequency" that is independent of both channel and service. Upconverter 123 coverts intermediate frequency signals channel specific radio frequency signals. The downstream RF signals are broadcast over the cable plant and ultimately received at the cable modems. This figure shows cable modems as blocks 105, 106, 107A–C, 108, 108, 109, 111, 112, and 113. The components on the downstream path between upconverter 123 and the cable modems are not depicted.

On the upstream path, data from some of the cable modems enters cable plant 101 via distribution networks 121A–C. Each distribution system will have its own topology, which varies as a function of the local neighborhood geography, the number and type of cable modems in the distribution network, etc. As a result, signals from different modems on a given distribution network are attenuated by different amounts on the upstream path.

Data from modems on the distribution networks is typically transmitted as electrical signals over conventional coaxial cables 120A–C, also referred to as a trunk lines. In some instances, coaxial trunk lines are replaced with optical fiber. Data traveling upstream from trunk lines 120A–C reaches fiber nodes 118A–C, which convert the electrical signals to optical signals that can be transmitted over fiber optic cables 116A–C. Typically fiber optic cables 116A–C contains pairs of cables carrying data in opposite directions. These cables typically run for as long as 100 km and are used to carry data for most of the distance between the neighborhood distribution networks and hub 102.

Hub 102 can typically support up to 80 fiber nodes and each fiber node can support up to 500 or more subscribers. Thus, there are normally multiple fiber optic cables emanating from hub 102 (only three are shown to simplify the illustration). Note that in many systems, a technology know as dense wave-division multiplexing (DWDM) increases fiber capacity (and consequently the number of potential subscribers). DWDM is a technique for transmitting data via more than one wavelength of light on the same fiber.

Data from fiber optic cables 116A–C enters hub 102 via fiber transceivers 114A–C, which convert optical signals to electrical signals for processing in hub 102. Focusing on signals generated in the top distribution network 121A, upstream data from optical transceiver 114A passes through attenuators 125A and 127A before passing through a splitter 129A and onto a port of CMTS 104. As shown, parallel paths exist for distribution networks 121B and C.

To allow verification of the downstream path, hub 102 includes diplex filters 131A–C, which are connected to the downstream path (not shown) and to attenuators 133A–C. Cable modems 107A–C serve as part of the verification system. They are attached to diplex filters 131A–C to allow the CMTS to confirm that a modem can actually transmit on the associated distribution network. Thus, the network subsystem given by diplex filters 131A–C and cable modems 107A–C assist in verifying the operation of cable plant 101 and in isolating problems that arise in that plant. As shown, upstream data from the modems passes through one of diplex filters 131A–C and then onto one of attenuators 133A–C before entering one of splitters 129A–C.

As noted, the distribution networks have various topologies. Topological differences in paths from various modems to hub 102 result in different attenuation levels. Yet, CMTSs are designed to work at single power level. For example, CMTS 104 may be designed to receive signals centered at 0 dBmV amplitude. If all modems transmitted at the same power level, some signals received at CMTS 104 would be well above the required power level and some would be well below that level. To account for the effects of topological variations in the distribution networks, many cable systems require that different modems transmit at different power levels. The particular transmission power levels are selected to cause all signals to arrive at the CMTS with the same power level. The DOCSIS standard for transmission defines a procedure for adjusting modem transmission power such that the received power at the head-end is constant. This procedure, called "ranging," is described below. Note that DOCSIS is an interim standard establishing the protocol for two-way communication of digital data on cable systems defined and adopted by a consortium of industry groups, and is widely-followed in the field of cable modem data communication.

FIG. 1 illustrates a hypothetical set of modem power levels chosen such that transmissions from all modems will reach CMTS 104 centered at 0 dBmV. As shown, transmissions from modem 105 are made at +31 dBmV and those from modem 106 are made at +48 dBmV. This difference results from different attenuation levels on the paths from these modems through distribution network 121A. Signals from modem 105 are less attenuated by the distribution network than are signals from modem 106. In the end, all transmissions, regardless of source modem, reach optical transmitter 118A at +17 dBmV. Similar results are illustrated for distribution networks 121B and 121C and their associated cable modems.

Because signals from all modems on a given distribution network experience the same attenuation while passing through the fiber optic and hub sections of the network, no further modem specific adjustments are required. As shown in FIG. 1, transmissions passing through optical components 118A, 116A, and 114A lose 4 dBmV so that they enter hub 102 as +13 dBmV electrical signals. Other optical sections have different effects. For example, optical components 118B, 116B, and 114B together amplify signals by 1 dBmV and optical components 118C, 116C, and 114C together amplify signals by 14 dBmV. Because the different fiber optic segments attenuate/amplify by differing amounts, hub attenuators 125A–C attenuate by different amounts so that all transmissions, regardless of source modem or fiber node, reach the CMTS at the same power level. Thus, all signals upstream from attenuators 125A–C should have the same power level (at the same position vis-à-vis CMTS 104). As shown, all transmissions leave attenuators 125A–C at +10 dBmV.

A hub can measure all signals at an "X" point. This point should be chosen at a location where all transmissions are expected to have the same power level with respect to the CMTS—regardless of fiber node or source modem. More precisely, the X point should be chosen, with respect to a CMTS amplitude detector location, so that power level is linearly related in a known manner that is consistent across all nodes feeding the CMTS. Usually, the X point will be at or proximate the CMTS. One common location is on a line card in the CMTS. In FIG. 1, the X point (indicated by reference numbers 135A–C) for each CMTS input port is located between attenuators 125A–C and attenuators 127A–C, respectively. At these points, the power level is expected to be +10 dBmV. Amplitude detectors may be positioned at these locations (or in the CMTS) so that they can measure power levels during testing. Note that in FIG. 1, the X points could be chosen to be any locations upstream of attenuators 125A–C.

The cable network shown in FIG. 1 is not static. Cable networks are composed of passive and active devices, each having a particular attenuation and frequency response. The overall frequency and amplitude response of a cable network system varies nearly continually. Cable lines are installed in new geographic areas, new cable modems and components are installed on existing segments of the network, the condition of existing lines deteriorates or improves, the performance of amplifiers, splitters, etc. changes, and so on.

Figure 2:
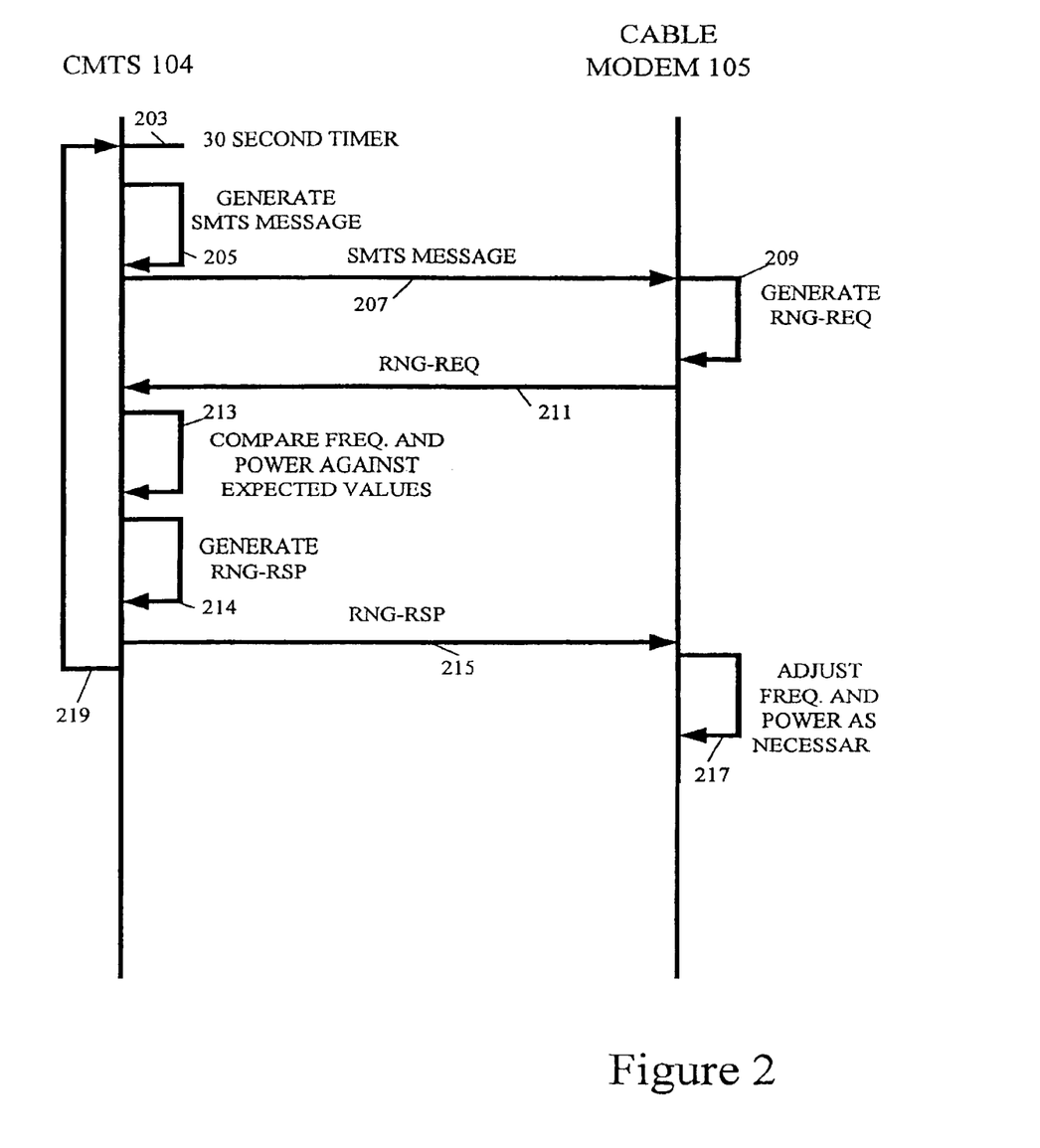
FIG. 2 is an interaction diagram depicting the DOCSIS protocol for ranging.

As the power level of upstream signals changes, the CMTS attempts to cause the cable modems to adjust their output power levels so that it constantly receives upstream signals at 0 dBmV (or some other specified level). This adjustment may be accomplished via DOCSIS ranging messages. The DOCSIS ranging protocol for adjusting cable modem power and frequency is illustrated in FIG. 2 described below.

This approach works well so long as the upstream channel is relatively noise free. However, in the presence of significant noise, the CMTS cannot always correctly compute the relevant power of signals it receives. This is because the signals may be rapidly fluctuating. The instantaneous power measurements made at the X point may be arbitrarily distorted in the positive or negative direction due to the noise. In this case, continuous power adjustments may be requested by the CMTS. If power level adjustments are made continuously, the head-end may wrongly get the conclusion that a modem cannot be ranged properly and disconnect the modem, even if there is no problem except a high but tolerable noise level.

What is needed therefore is an improved technique for controlling cable modem power levels in the presence of upstream noise.

SUMMARY OF THE INVENTION

The present invention provides a technique for selectively adjusting the power and/or frequency of cable modems. Unlike prior art techniques, the invention does not rely solely on the most recent measurement of these values to determine whether a change is necessary. Rather, it considers multiple recent measurements and from these makes its assessment. In one approach, the invention employs an average of the recent measurements to determine whether a change in power or frequency is necessary. There are actually at least three determinations that can make use of multiple recent measurements. These include (1) determining whether the signals are fluctuating to an extent that requires a special adjustment technique, (2) determining whether an adjustment is necessary (using the special technique), and (3) determining how large of an adjustment is necessary.

One aspect of this invention pertains to methods of adjusting the power of a cable modem on a cable network. The method may be characterized by the following sequence: (a) determining that the power of cable modem signals received at the head-end of the cable network fluctuate by more than a defined amount; (b) calculating a power adjustment using multiple recent power measurements of cable modem signals taken at the head-end of the cable network; and (c) instructing the cable modem to adjust its power based upon the calculated power adjustment. In one embodiment, a CMTS performs at least the determining and the calculating operations. In some embodiments, the CMTS also instructs the cable modem to adjust its power. It may do this by sending a ranging response DOCSIS message, for example.

In order to determine that signals from the cable modem fluctuate more than the defined amount (operation (a)), the system may calculate a "deviation" from an expected power level over multiple recent power measurements of the cable modem's signals. The power level may be calculated over eight or sixteen of the recent power measurements, for example. In another approach, the system performs the fluctuation analysis based upon how often the cable modem has been instructed to change its power level. If it has been so instructed more than a threshold percentage of the opportunities for adjustment, then the fluctuation is greater than the defined amount.

In order to calculate the power adjustment, the system may calculate an average difference between an actual power and an expected power over at least eight recent power measurements at or proximate the head-end of the cable network. A more specific calculation involves offsetting the average difference by a multiple of the deviation in actual power measurements over recent power measurements. In an alternative approach, calculating the power adjustment requires detecting a signal-to-noise ratio and from that value choosing an associated adjustment (using a table of signal-to-noise ratio versus adjustment level, for example).

Another aspect of the invention pertains to methods that may be characterized by the following sequence: (a) adjusting the cable modem power based on a first technique; (b) determining that upstream signals from the cable modem contain more than a threshold level of noise or fluctuation; and (c) adjusting the cable modem power based upon a second technique that averages recent cable modem power measurements. If the system performing this method subsequently determines that the upstream signals from the cable modem now contain less than the threshold level of noise (or fluctuation), the system may revert to the first technique for adjusting the cable modem power.

In one approach, the first technique requires (i) determining a difference between an actual power and an expected power of an upstream signal from the cable modem and (ii) instructing the cable modem to adjust its power based upon the difference. Regardless of how the first technique is accomplished, the second technique may require (i) calculating a power adjustment based upon a plurality of recent differences between actual power and expected power of upstream signals from the cable modem and (ii) instructing the cable modem to adjust its power based upon the calculated power adjustment.

Another aspect of the invention pertains to cable modem termination systems that may be characterized as including the following elements: (a) a receiver arranged to detect received power levels from transmissions of a cable modem; (b) a component that calculates a single power level adjustment for the cable modem based upon a plurality of the detected power levels; and (c) a component that generates instructions to the cable modem to make the calculated power adjustment. The CMTS may also include a component that determines whether signals from a cable modem contain more than a threshold level of noise. The CMTS elements may be implemented in hardware and/or software. In a preferred embodiment, the receiver is a hardware device, and the components for calculating and generating are implemented as software.

In one embodiment, the receiver determines differences between the detected power levels and an expected power level. The component for calculating receives these differences and calculates the single power level adjustment based upon the differences. More generally, the calculating component may calculate the power level adjustment by any of the techniques described above. Similarly, the generating component may generate instructions by any suitable technique (e.g., via a DOCSIS ranging response indicating the power level adjustment).

Note that the above methods and apparatus may be adapted to control cable modem transmit frequency as well as power. Thus, one aspect of the invention provides a method of adjusting the frequency of a cable modem on a cable network by (a) calculating a frequency adjustment using a plurality of recent frequency measurements of signals from the cable modem taken at or proximate the head-end for the cable network; and (b) instructing the cable modem to adjust its frequency based on the calculated frequency adjustment.

These and other features and advantages of the invention will be described in detail below with reference to the associated drawings.

DETAILED DESCRIPTION OF THE PREFERRED EMBODIMENTS

The present invention may be implemented in many different ways. Hardware and/or software may be employed for some of the various operations described herein. The invention may operate as an extension of existing protocols or may operate wholly independently.

In one implementation, the invention takes advantage of the DOCSIS ranging protocol. DOCSIS ranging may be understood as follows. During live communication, modems send upstream data at allotted time periods or "time slots." On the downstream cable data channel, data is broadcast (or multicast) by a CMTS to cable modems served on that downstream channel. Upstream transmission is complicated by the fact that the upstream path is used as a multiple access channel shared by the large group of cable modems (on that channel) to communicate with the CMTS. To prevent collisions, the upstream channel is time-slotted and cable modems need to contend for gaining access to the CMTS in this shared channel. This time slotting procedure is sometimes referred to as time division multiplexing (TDM).

Typically, time slots are scheduled using a "minislot" as the basic unit of scheduling. The CMTS remotely schedules each and every minislot on the upstream channel. The CMTS conveys this minislot allocation information (to the set of modems sharing the upstream channel) ahead of time using bandwidth allocation "MAP messages" that are periodically broadcast on the downstream channel.

Among the time slots mapped by the CMTS is a slot called the "station maintenance" time slot (SMTS). In many implementations, each cable modem receives at least one SMTS every 30 seconds. This SMTS is sent to the modem in a MAP message. When a cable modem receives an SMTS it must transmit a ranging request (RNG-REQ) message which is used by the CMTS in order to determine if the cable modem is operational and to maintain the link to that cable modem. If the cable modem does not respond to the SMTS after 16 tries, the cable modem is assumed to be powered off or disconnected. If it does respond—via a Ranging Request (RNG-REQ)—the CMTS determines whether the amplitude and frequency of the response have the expected levels.

FIG. 2 presents an interaction diagram depicting the interactions between a cable modem termination system 104 and a cable modem 105 during ranging, in accordance with DOCSIS. As illustrated, the procedure is initiated by the expiration of a 30-second timer as illustrated at 203. Note that the 30 seconds is an arbitrary value and may be varied from implementation to implementation. When CMTS 104 determines that the timer has expired at 203, it generates and sends an SMTS within a MAP message at 205. That MAP message then travels over the cable network at 207 where it is received by destination cable modem 105.

Upon receipt of a MAP message that includes an SMTS message, cable modem 105 generates a standard ranging request message at 209. The cable network transmits the ranging request upstream, back to the head-end at 211.

Upon receipt of the ranging request, CMTS 104 compares the received frequency and amplitude of that request against an expected frequency and amplitude at 213. Depending upon whether CMTS 104 identifies any significant deviation between the actual and expected frequency and amplitude, the CMTS may decide to abort the service of cable modem 105. This would occur if the frequency and/or power (or some combination thereof) deviated from the expected values by more than a threshold value. This threshold may vary from standard to standard and implementation to implementation. Assuming that the deviation falls within a safe threshold, CMTS 104 will generate a ranging response message at 214 and send that message back downstream to cable modem 105 at 215.

In accordance with the DOCSIS standard, the ranging response message will include various pieces of information including a time offset, a frequency error, and a power error. The time offset indicates how long the message from the cable modem took to travel to the CMTS 104. The frequency and power errors are deviations in the detected frequency and power from expected values. When cable modem 105 notes these errors, it will adjust its frequency and power as necessary to compensate for the deviation(s). See 217. After the 30-second timer has once again expired, the process begins again as indicated by the return of process control at 219.

As mentioned, the CMTS determines (using ranging request messages for example) whether individual cable modems are transmitting data at the correct power and frequency. If it finds that one of them is not, it instructs that modem (via a ranging response message for example) to adjust its transmission power and/or frequency. When the upstream channel from a particular modem to the CMTS contains significant noise, the power and frequency values read by the CMTS will include noise components. The CMTS then causes the cable modem to change its power and/or frequency after erroneously concluding that the cable modem is transmitting at the wrong power and/or frequency. The problem is compounded because noise often causes successive transmission measures to fluctuate widely. Thus, the CMTS may erroneously conclude that the cable modem is unable to provide stable transmissions.

Upstream digital signals might be hampered by the network variations from various sources. Among these are (1) ingress signals from sources such as amateur radio transmissions, citizen band radios, etc.; (2) impulse and electrical signal ingress from electrical sources within a home, such as hair dryers, light switches, and thermostats; or from high-voltage lines that run near Cable TV (CATV) cabling in the network; (3) amplifier noise from improperly configured amplifiers; and (4) broadband and narrowband ingress noise from major appliances and CB and short-wave radios. Another cause of fluctuation at the head-end is variable transmit levels caused by temperature-dependent signal loss over coaxial cable. Depending upon local climate, this can cause variations of 6 to 10 dB over the course of a year. Yet another cause of fluctuation is "clipping." In the case of laser clipping, this means that the output (signal/light) power/energy of the laser is limited (but the laser is not turned off). This can cause signal distortions, if the laser signal is modulated and the desired output signal strength exceeds the signal energy that the laser can support. This can cause data corruption, and is therefore undesirable with a modulated signal.

The noise and fluctuations on a cable network are usually most pronounced at the head-end. The upstream data path to the head-end is susceptible to picking up noise and interference from the entire network and all upstream noise ultimately ends up at the head-end. This effect is known as "noise funneling" because of the cumulative nature of the noise from anywhere on the network that becomes concentrated at the head-end. As a network serviced by a single RF receiver increases in size, the probability of noise funneling also increases.

Figure 3:
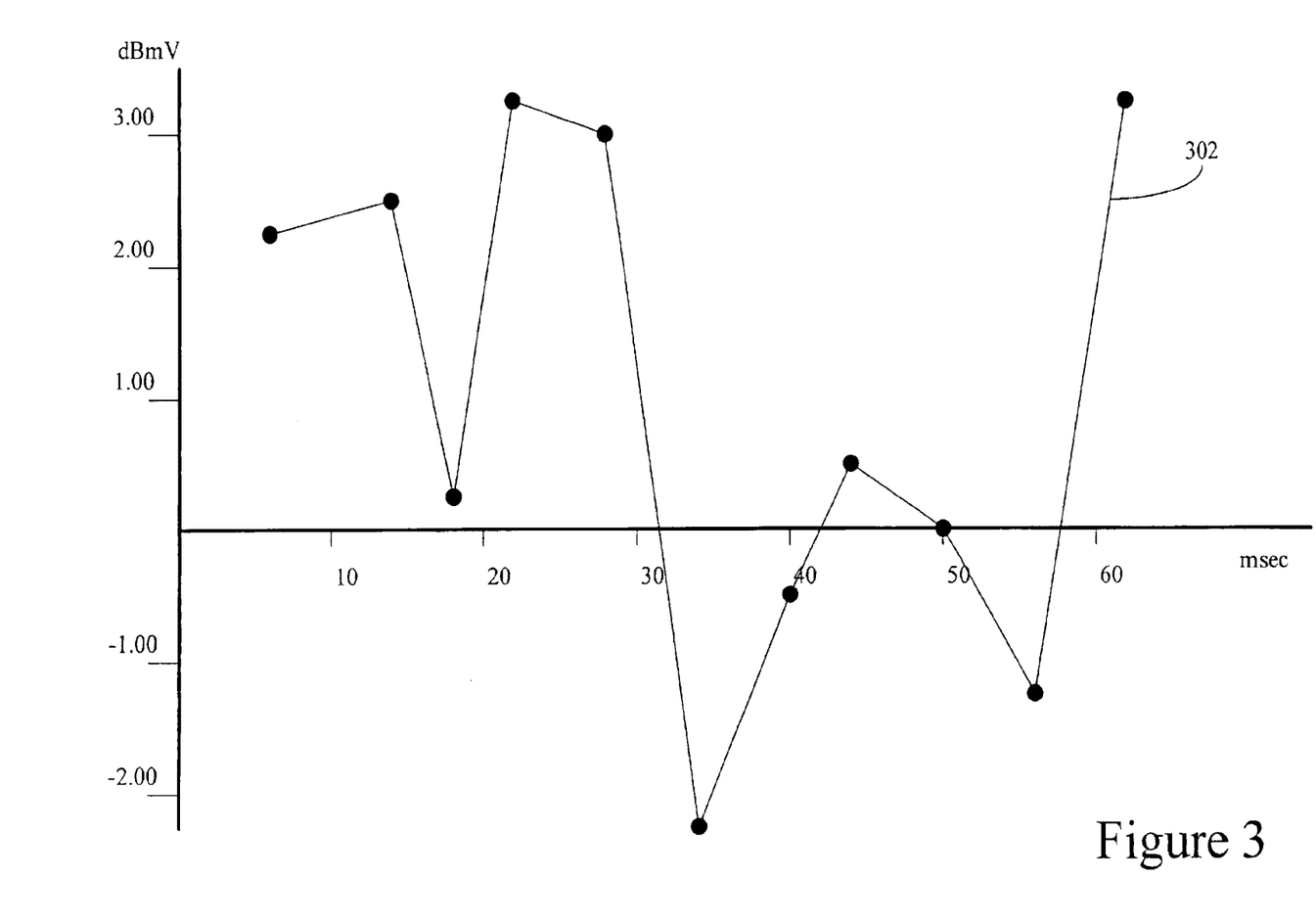
FIG. 3 is a graph depicting the power level of cable modem signals received by a CMTS in the presence of upstream noise.

The effect of one type of network noise on detected power level is depicted in FIG. 3. The actual amplitude data points of this example were taken at 4 and 6 millisecond intervals. As shown, the amplitude 302 of a cable modem ranging request, as detected at a CMTS, varies rapidly. Subsequent adjustments are in the range of +/−5 dBmV, which is so great that it may impact the ability to receive data properly. Wrong or unnecessary adjustments may be made based on this data. If power level adjustments are made continuously—as may result when the head-end encounters the data of FIG. 3—the head-end may wrongly conclude that the modem cannot be ranged properly and disconnect the modem. In many cases, noise as depicted in FIG. 3 may be quite tolerable for operating the cable network and associated CMTS.

The algorithms of this invention are concerned with at least one, and typically two, issues. First they determine whether an adjustment is necessary. Hopefully, such algorithm prevents unneeded adjustments that may be otherwise suggested by a noisy upstream path or normal network fluctuations. Second, the algorithm(s) may determine how large an adjustment is required, assuming that one is necessary.

Generally networks operating under the algorithms of this invention consider multiple frequency or amplitude readings from a cable modem and, based upon a combination of these readings, determine whether an adjustment is proper. This helps prevent the system from making too frequent adjustments to cable modem transmission settings when the received signal fluctuates rapidly. Often an average of multiple recent measurements is considered in determining whether an adjustment is necessary.

When the network does determine that an adjustment is appropriate, it provides an appropriate adjustment value that is not based solely on one recent measurement. The adjustment may be chosen based upon various criteria. In some embodiments, the network calculates an appropriate adjustment using a statistical or pseudo-statistical evaluation of recent readings. In other embodiments, the network picks an appropriate adjustment from empirically generated values in a stored table or list.

Another issue that may be considered by the algorithms of this invention is the choice of a method to be employed, at any given time, for controlling adjustments. Often, the network will have two or more distinct approaches to determining whether an adjustment should be made. One of these may be appropriate for stable network conditions and another may be appropriate for fluctuating network conditions. In the case of stable network conditions, the algorithm may require that adjustment decisions be based on only the most recent reading(s). In the case of fluctuating network conditions, the algorithm may require that these decisions be based on a plurality of readings.

Figure 4:
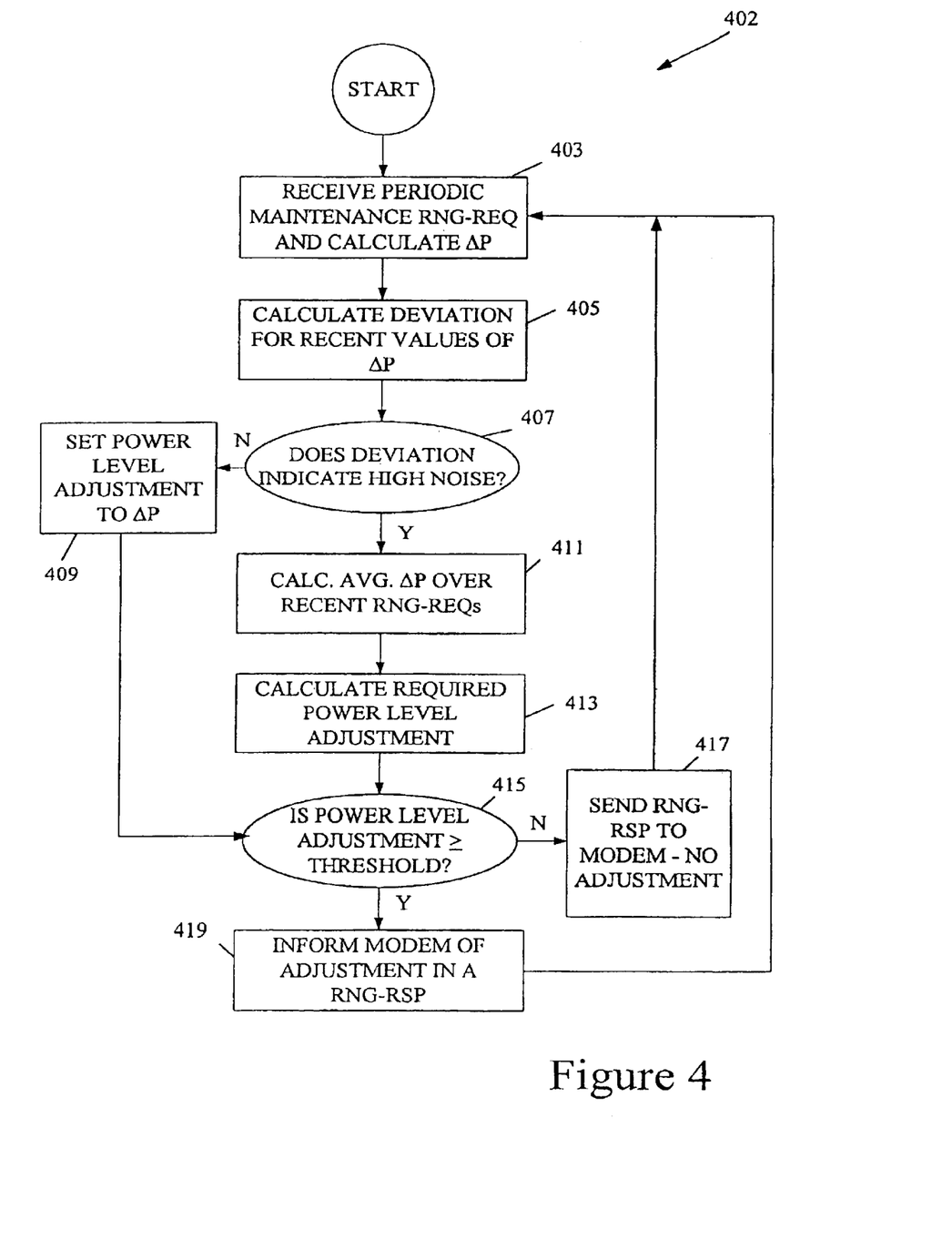
FIG. 4 is a process flow diagram depicting a method for causing cable modems to adjust their power levels in the presence of upstream noise.

FIG. 4 presents one specific embodiment of the present invention, which may be implemented as software and/or hardware. As shown in FIG. 4, a process 402 begins with a CMTS receiving a periodic maintenance ranging request (RNG-REQ) and calculating a change in power level from that request. As noted, DOCSIS ranging requests issuing from cable modems allow a CMTS to measure the power, frequency, and travel time associated with signals generated by the cable modem. The change in power or "$\Delta P$" refers to the difference between an actual measured power level at or near the CMTS and an expected power level at that location. The CMTS and the cable network as a whole perform best when the power level of the received signal is at the expected level.

After the CMTS receives the ranging request and calculates a value $\Delta P$ at 403, it can then calculate a "deviation" for recent values of $\Delta P$. See 405. The purpose of this procedure is to allow the CMTS to determine whether recent values of $\Delta P$ are fluctuating rapidly. This is often the case when the upstream signal from a cable modem is particularly noisy. In a preferred embodiment, the CMTS maintains a running measure of this deviation. Various approaches to calculating a deviation will be described in more detail below.

After the deviation has been calculated, the CMTS determines whether the deviation indicates that there is noise on the network at 407. This may involve a procedure as simple as determining whether the value of the deviation is above some threshold value. Assuming that the CMTS determines that there is a low level of noise on the network (i.e., 407 is answered in the negative), the system sets the required adjustment to the calculated value of $\Delta P$ at 409. Then if the CMTS needs to instruct the cable modem to change its power level, it simply uses the current value of $\Delta P$.

Assuming that the system determines that the deviation is high enough to indicate a problematic level of noise (e.g., 407 is answered in the affirmative), the CMTS next calculates an "average" $\Delta P$ over recent ranging requests. This has the effect of damping any spikes in the value of $\Delta P$ that result from noise on the network. See block 411. Various approaches to calculating the average of recent $\Delta P$ values may be employed. A few of these are discussed below.

At 413, the CMTS calculates the required power level adjustment based upon the average $\Delta P$. In the simplest case, the power level adjustment is simply the value of the average $\Delta P$. More sophisticated cases will be described below.

After the power level adjustment is calculated (at either 413 or 409 in the low noise case), the CMTS determines whether the power level adjustment is sufficiently large to require an actual adjustment. In some cases, the marginal advantage of causing a cable modem to change its power level is offset by the difficulties associated with frequent adjustments. In the embodiment depicted in process 402, the power level is only adjusted if the value of the calculated power level adjustment is greater than or equal to a prescribed threshold. See decision block 415.

Assuming that CMTS determines that the value of the power level adjustment is sufficiently high to require a change, it informs the modem of the adjustment in a ranging response as indicated at 419. Thereafter, process control returns to 403, where the CMTS awaits the next periodic maintenance ranging request. If, on the other hand, the CMTS determines that the calculated power level adjustment is insufficiently great to cause a change in the modem's power output, it nevertheless sends a ranging response message—as it must under the DOCSIS standard. See block 417. Thereafter, process control returns to 403 where the CMTS awaits receipt of the next periodic maintenance ranging request.

Each pass through the process 402 causes the CMTS to update its calculated value of deviation at 405. Thus, the system maintains an up to the minute indication of the level of noise in a given modem's upstream path. Further, when the deviation indicates that there is high noise on the path, each pass through process 402 updates the "average $\Delta P$" value. Thus, even in the case of a noisy path, the CMTS can get a good indication of whether the power of a cable modem signal is drifting to a point where correction is required.

Note that the above procedure could be implemented to control the frequency at which a cable modem sends transmissions. In such case, the occurrences of $\Delta P$ in the process could be replaced with $\Delta f$ (the difference in frequency between a measured value and an expected value). Of course, references to "power level adjustment" should be replaced with "transmission frequency adjustment." In an alternative embodiment, the CMTS always calculates frequency adjustment based upon some average of recent values of $\Delta f$. In this embodiment, the CMTS need only perform the operations indicated at 411, 413, 415, 417, 419, and 403.

The "deviation" referenced at block 405 (an indicator of noise on an upstream path) can be calculated by various techniques. In one embodiment, it represents some measure of a standard deviation in a true statistical sense. In another embodiment, "deviation" is based on the relative frequency of detected power level changes. If, for example, more than 30% of all power level measurements indicate the necessity for a power level change, the CMTS would determine that there is likely a high level of noise on the upstream path. If, afterwards, the percentage of power level changes drops below 20%, for example, the CMTS would conclude that the level of noise on the upstream path has returned to a sufficiently low level. In other words, decision 407 would be answered in the negative. Obviously, the 20% and 30% values presented in this example are for the sake of illustration only.

If the deviation is to represent a standard deviation in the case of statistics, various approaches to calculating it may be employed. A rigorous calculation based upon several recent measurements of $\Delta P$ may require more computation effort than is desirable. A simpler approximation of the standard deviation is given by $$\text{Deviation} = ((\text{Deviation} * 7) + \text{abs}(\text{Current\_Offset}))/8.$$

In this approach the value of "Deviation" is updated with each received ranging request message from a modem (or with every other message or some arbitrary frequency).

After initialization and completed initial ranging, "Deviation" is initialized with a value of 0. The value of Deviation may also be computed on a per interface basis. Note that a CMTS may have multiple interfaces for receiving upstream data from the cable network. Of course expressions other than the above may be employed for approximating the standard deviation.

In process 402, an average value of ΔP is calculated at 411. This too may be calculated by various methods. The ultimate goal is to average out the effect of noise on the upstream path. In one embodiment, the CMTS keeps the last "X" number of offsets (ΔP or Δf) and sums these values prior to dividing by the value of X. Preferably, X equals either eight or sixteen.

In an alternative embodiment, the average may be calculated by the following expression:

$$\text{Avg\_Offset} = ((\text{Avg\_Offset} \cdot 7) + \text{current\_Offset})/8$$

Here, Avg_Offset refers to either ΔP or Δf. Preferably, the value of Avg_Offset is reset to 0 after each power adjustment and after successful initial ranging. Note that in this embodiment, only when the value of Avg_Offset exceeds a threshold (preferably configurable by the user) is the modem power level adjusted accordingly. See decision block 415.

As indicated in the above discussion of process 402, it may be desirable to provide a power level adjustment that is different from the calculated value of "average ΔP." See 413. It has been found that the correction algorithm normally causes the cable modem power level to increase in the presence of a noisy signal. See FIG. 3 for example. One approach to providing a more accurate correction accounts for the signal's deviation in the presence of noise. In one specific embodiment, the required power level adjustment is less than the Avg_Offset value by some function of the deviation in recent signal power measurements from the cable modem. For example, the following expression may be used:

$$\text{Required\_Offset} = \text{Avg\_Offset} - N*(\text{signal deviation})$$

The value of N is a preferably a configurable value. In one example, a default value of N is 2. The value of the signal deviation may be approximated by the expression for Deviation presented above or by some other expression or technique. Preferably, it has some relation to the statistical definition of deviation.

In yet another alternative embodiment, the required power level adjustment may be obtained based upon a measured value of the current signal-to-noise ratio in the upstream path. Note that many CMTS receivers automatically calculate signal-to-noise ratio. Required power level adjustment values may be provided for different ranges of signal-to-noise ratio. These power level adjustment values may be determined empirically or analytically. In some cases they may be recalculated on the fly. In one implementation, the CMTS stores a logical table of power adjustment versus signal to noise ratio. In this embodiment, the operation at 411 in process 402 may sometimes be unnecessary.

Figure 5:
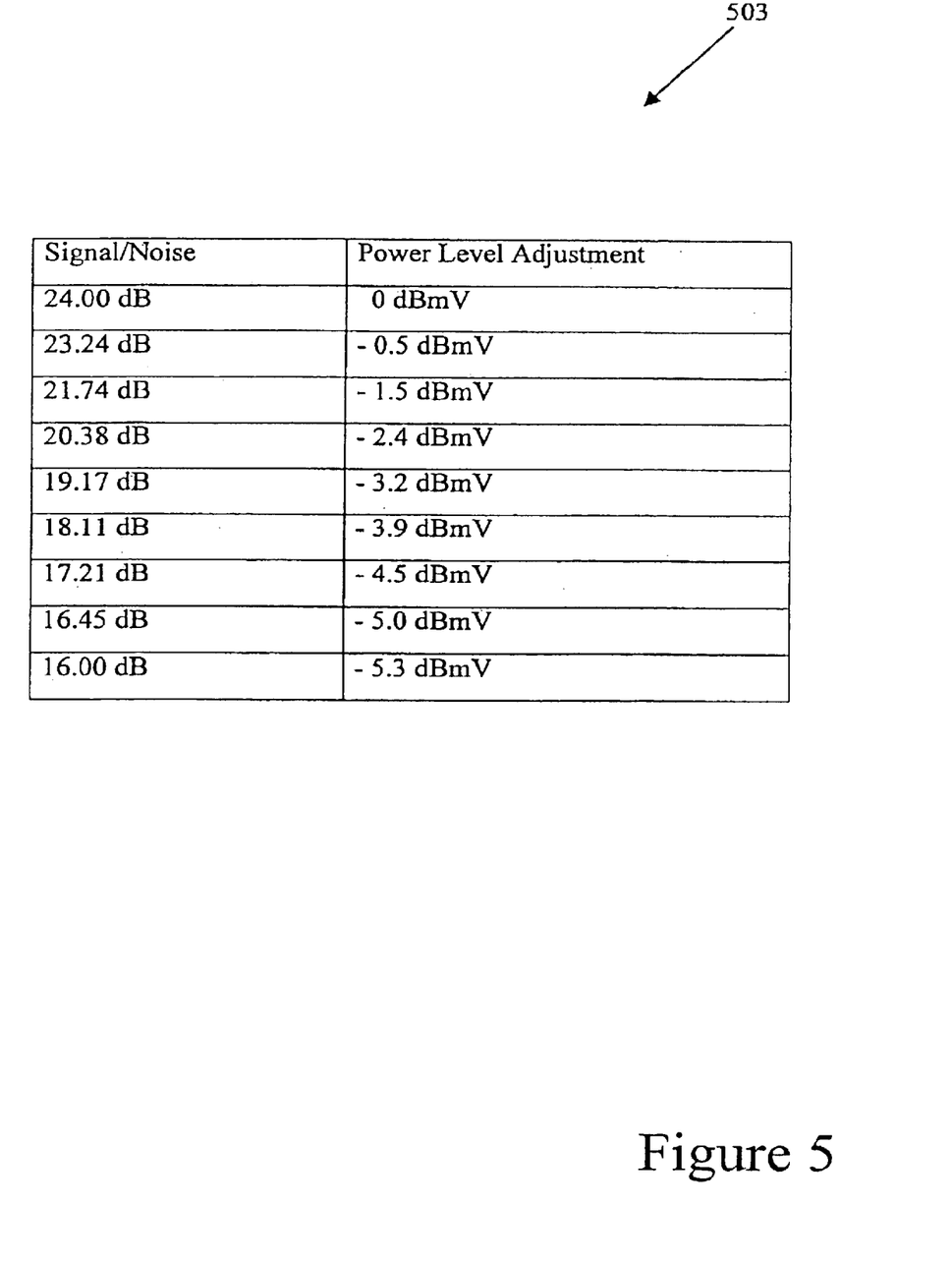
FIG. 5 is a table that may be used to provide power level adjustments based upon signal-to-noise ratio in accordance with one embodiment of this invention.

FIG. 5 presents one example of such logical table. The table may be stored in a number of different formats, preferably within memory in a CMTS. A number of typical values of signal-to-noise ratio are provided in table 503. Associated power level adjustments are provided for these values. As shown, the magnitude of adjustment increases with increasing values-of-signal to noise ratio. Similar tables may be provided for frequency adjustments.

Figure 6:
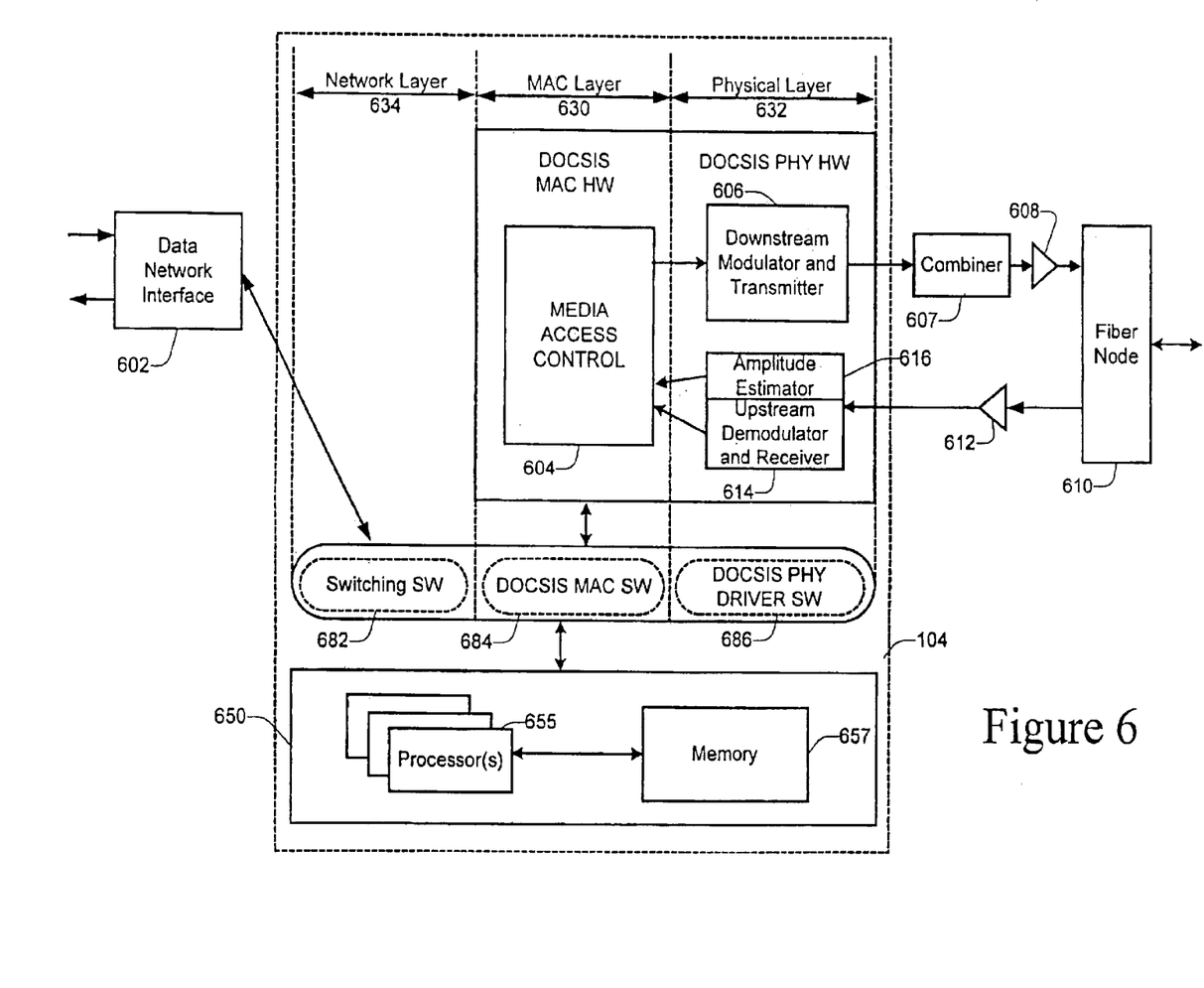
FIG. 6 is a block diagram depicting hardware and logical blocks of a CMTS suitable for implementing the present invention.

In one embodiment, the invention is implemented on a CMTS. In a specific embodiment, the invention is implemented partially as software and partially as hardware within the CMTS. Some of the functions of a typical CMTS include (1) interfacing to a two-way data communications network; (2) providing appropriate media access control or MAC level packet headers for data on the RF interface of a cable system; and (3) modulating and demodulating the data to and from the cable system. As mentioned, the cable modem termination system may also implement some or all of the cable modem power/frequency adjustment methods of this invention. FIG. 6 presents a block diagram showing hardware and software that may be employed in CMTS 104. As shown, a Data Network Interface 602 provides an interface between an external data source and the cable system. External data sources transmit data to data network interface 602 via optical fiber, microwave link, satellite link, or through various other media. Interface 602 may include hardware and/or software for interfacing to various network types such as, for example, Ethernet, ATM, frame relay, etc. as appropriate.

In the specific embodiment as shown in FIG. 6, CMTS 104 provides functions on three network layers including a physical layer 632, a Media Access Control (MAC) layer 630, and a network layer 634. Generally, the physical layer is responsible for receiving and transmitting RF signals on the cable plant. Hardware portions of the physical layer include a downstream modulator and transmitter 606 and an upstream demodulator and receiver 614. The physical layer also includes software 686 for driving the hardware components of the physical layer.

Upstream optical data signals (packets) arriving via an optical fiber node 610 are converted to electrical signals by a receiver 612 (see receivers 114A–C of FIG. 1). Next, the upstream information packet (RF electrical signals) is demodulated by the demodulator/receiver 614 and then passed to MAC layer block 630. A primary purpose of MAC layer 630 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems or to a hub (if sent upstream) by a MAC layer block 630 in CMTS 104. Note that the cable modems also include MAC addressing components. In the cable modems, these components encapsulate upstream data with a header containing the MAC address of the hub.

MAC layer block 630 includes a MAC hardware portion 604 and a MAC software portion 684, which together serve the above-described functions. In a preferred embodiment, MAC hardware portion 604 is distinct from the router's general-purpose microprocessor and is dedicated to performing some MAC layer functions.

After MAC layer block 630 has processed the upstream information, it is then passed to network layer block 634. Network layer block 634 includes switching software 682 for causing the upstream information packet to be switched to an appropriate data network interface on data network interface 602. When a packet is received at the data network interface 602 from an external source, the switching software within network layer 634 passes the packet to MAC.layer 630. MAC block 604 then transmits information via a one-way communication medium to downstream modulator and transmitter 606. Downstream modulator and transmitter 606 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 607. An optical converter 608 converts the modulated RF electrical signals to optical signals that can be received and transmitted via Fiber Node 610 to the cable modem hub.

It is to be noted that alternate embodiments of the CMTS (not shown) may not include network layer 634. In such embodiments, a CMTS device may include only a physical layer and a MAC layer, which are responsible for modifying a packet according to the appropriate standard for transmission of information over a cable modem network. The network layer 634 of these alternate embodiments of CMTS devices may be included, for example, as part of a conventional router for a packet-switched network. In a specific embodiment, the network layer of the CMTS is configured as a cable line card coupled to a standard router that includes the physical layer block 632 and MAC layer block 630. Using this type of configuration, the CMTS is able to send and/or receive IP packets to and from the data network interface 602 using switching software block 682.

As shown in FIG. 6, CMTS 104 includes a central hardware block 650 including one or more processors 655 and memory 657. These hardware components interact with software and other hardware portions of the various layers within the CMTS. They provide general purpose computing power for much of the software. Memory 657 may include, for example, I/O memory (e.g. buffers), program memory, shared memory, etc. Hardware block 650 may physically reside with the other CMTS components. In one embodiment, the software entities 682, 684, and 686 are implemented as part of a network operating system running on hardware 650. Preferably, the power/frequency adjustment functions of this invention are implemented in software as part of the operating system. In FIG. 6, such software may be part of MAC layer software 684 or may be closely associated therewith. Of course, the power/frequency adjustment logic could reside in hardware, software, or some combination of the two.

In one embodiment, power/frequency control is conducted as follows. Initially, MAC layer logic 630 instructs a cable modem to transmit a signal to CMTS 104 (via a SMTS message for example). When the modem replies (via a ranging request for example), an amplitude estimator 616 (associated with upstream demodulator and receiver 614) measures the amplitude, frequency, and/or signal-to-noise ratio of the signal. The needed values are then provided to MAC layer logic 630. From this data, MAC layer software 684 determines (1) level of fluctuation based upon current values together with stored recent values (2) whether a special correction algorithm should be employed, and if so (3) the level of correction that should be employed. MAC layer logic 630 then generates instructions (a ranging response message for example) for correction, as appropriate. Transmitter 606 sends these instructions to the cable modem.

Although the foregoing invention has been described in some detail for purposes of clarity of understanding, it will be apparent that certain changes and modifications may be practiced within the scope of the appended claims. For example, while ranging was described above, other techniques for causing modems to transmit signals at predefined frequencies and amplitudes may be employed.

What is claimed is:

1. A method of adjusting the power of a cable modem on a cable network, the method comprising:
   (a) during execution of a ranging protocol in the cable network, determining that cable modem signals received at or proximate a head-end of the cable network fluctuate in power by more than a defined amount;
   (b) at the head-end, calculating a power adjustment using a plurality of recent power measurements of signals taken over a plurality of ranging requests from the cable modem taken at or proximate the head-end of the cable network; and
   (c) from the head-end and during the ranging protocol, instructing the cable modem to adjust its power based upon the calculated power adjustment.

2. The method of claim 1, wherein a CMTS performs at least the determining and the calculating.

3. The method of claim 1, wherein the power measurements of signals from the cable modem are taken by an amplitude estimator in a CMTS.

4. The method of claim 1, wherein determining that signals from the cable modem fluctuate more than the defined amount comprises calculating a deviation from an expected power level over multiple recent power measurements of the cable modem's signals as received at or proximate the head-end of the cable network.

5. The method of claim 1, wherein the deviation is calculated over eight or sixteen of the recent power measurements.

6. The method of claim 1, wherein determining that signals from the cable modem fluctuate more than the defined amount comprises determining that the cable modem has been instructed to change its power level more than a threshold percentage of opportunities for adjustment.

7. The method of claim 1, wherein calculating the power adjustment comprises calculating an average difference between an actual power and an expected power over at least eight recent power measurements at or proximate the head-end of the cable network.

8. The method of claim 7, wherein calculating the power adjustment further comprises offsetting the average difference by a multiple of the deviation in actual power measurements over recent power measurements at or proximate the head-end of the cable network.

9. The method of claim 1, wherein calculating the power adjustment comprises determining an adjustment associated with a signal to noise ratio detected for upstream signals from the cable modem.

10. The method of claim 1, wherein instructing the cable modem to adjust its power comprises sending a ranging response DOCSIS message from a CMTS to the cable modem.

11. A method of controlling the power at which a cable modem sends data upstream on a cable network, wherein at or proximate a cable network head-end, the cable network periodically determines the power of upstream signals from the cable modem, the method comprising:
   (a) during execution of a ranging protocol in the cable network, adjusting the cable modem power by an amount calculated based on a first technique that does not average recent cable modem power measurements;
   (b) determining that upstream signals from cable modem contain more than a threshold level of noise or fluctuation; and
   (c) from the head-end and during the ranging protocol, sending instructions for adjusting the cable modem power by an amount calculated based upon a second technique that averages recent cable modem power measurements.

12. The method of claim 11, wherein adjusting the cable modem power based upon the first technique comprises:
   (i) determining a difference between an actual power and an expected power of an upstream signal from the cable modem; and
   (ii) instructing the cable modem to adjust its power based upon the difference.

13. The method of claim 11 wherein adjusting the cable modem power based upon a second technique comprise:
   (i) calculating a power adjustment based upon a plurality of recent differences between actual power and expected power of upstream signals from the cable modem; and
   (ii) instructing the cable modem to adjust its power based upon the calculated power adjustment.

14. The method of claim 11, wherein cable modem upstream power levels are determined using DOCSIS ranging requests.

15. The method of claim 11, further comprising:
   after instructing the cable modem to adjust its power, determining that the upstream signals from the cable modem contain less than the threshold level of noise or fluctuation; and
   returning to the first technique for adjusting the cable modem power.

16. A cable modem termination system comprising:
   (a) a receiver arranged to detect received power levels from transmissions of a cable modem;
   (b) means for implementing a cable network ranging to protocol that (i) uses a plurality of the detected power levels taken over a plurality of ranging requests to determine that cable modem signals fluctuate at the cable modem termination system by more than a defined amount and (ii) calculates a single power level adjustment for the cable modem based upon the plurality of the detected power levels; and
   (c) means for generating instructions, as part of the ranging protocol, to the cable modem to make the calculated power adjustment.

17. The apparatus of claim 16, wherein the receiver determines differences between the detected power levels and an expected power level, where the means for calculating receives the differences from the receiver and calculates the single power level adjustment based upon the differences.

18. The apparatus of claim 16, wherein the receiver is a hardware device, and wherein the means for calculating and the means for generating are implemented as software.

19. The apparatus of claim 16, wherein the means for calculating calculates the power level adjustment by calculating an average based upon the plurality of detected power levels.

20. The apparatus of claim 19, wherein the means for calculating calculates the power level adjustment by offsetting the average by a multiple of a deviation ia the detected power levels.

21. The apparatus of claim 16, wherein the means for calculating calculate the power level adjustment based on a signal-to-noise ratio determined from the plurality of detected power levels.

22. The apparatus of claim 16, wherein the means for generating generates a DOCSIS ranging response indicating the power level adjustment.

23. The apparatus of claim 16, further comprising means for determining whether signals from a cable modem contain more than a threshold level of noise.

24. A method of adjusting the frequency of a cable modem on a cable network, the method comprising:
   (a) during execution of a ranging protocol in the cable network, calculating a frequency adjustment using a plurality of recent frequency measurements of signals taken over a plurality of ranging request from the cable modem taken at or proximate the head-end for the cable network; and
   (b) from the head-end and during the ranging protocol, instructing the cable modem to adjust its frequency based con the calculated frequency adjustment.

25. The method of claim 24, wherein a cable modem termination system performs at least the detecting and the calculating.

26. The method of claim 24, wherein calculating the frequency adjustment comprises calculating an average difference between an actual frequency and an expected frequency over at least eight frequency measurements at or proximate the head-end of the cable network.

27. A computer program product comprising a machine readable medium on which are provided program instructions for adjusting the power of a cable modem on a cable network, the program instructions comprising instructions for:
   (a) during execution of a ranging protocol in the cable network, determining that cable modem signals received at or proximate a head-end of the cable network fluctuate in power by more than a defined amount;
   (b) at the head-ed, calculating a power adjustment using a plurality of recent power measurement of signals taken over a plurality of ranging requests from the cable modem taken at or proximate the head-end of the cable network; and
   (c) from the head-end and during the ranging protocol instructing the cable modem to adjust its power based upon the calculated power adjustment.

28. The computer program product of claim 27, wherein the instructions for determining that signals from the cable modem fluctuate more than the defined amount comprises instructions for calculating a deviation from an expected power level over multiple recent power measurements of the cable modem's signals as received at or proximate the head-end of the cable network.

29. The computer program product of claim 27, wherein the instructions for calculating the power adjustment comprises instructions for calculating an average difference between an actual power and an expected power over at least eight recent power measurements at or proximate the head-end of the cable network.

30. The computer program product of claim 29, wherein the instructions for calculating the power adjustment further comprises instructions for offsetting the average difference by a multiple of the deviation in actual power measurements over recent power measurements at or proximate the head-end of the cable network.

31. The computer program product of claim 27, wherein the instructions for calculating the power adjustment comprises instructions for determining an adjustment associated with a sign to noise ratio detected for upstream signals from the cable modem.

32. A computer program product comprising a machine readable medium on which are provided program instructions for controlling the power at which a cable modem sends data upstream on a cable network, wherein at or proximate a cable network head-end, the cable network periodically determines the power of upstream signals from the cable modem, the program instructions comprising instructions for:

(a) dung execution of a ranging protocol in the cable network, adjusting the cable modem power by an amount calculated based on a first technique that does not average recent cable modem power measurements;

(b) determining that upstream signals from the cable modem contain more than a threshold level of noise or fluctuation; and (c) from the head-end and during the ranging protocol, sending instructions for adjusting the cable modem power by an amount calculated based upon a second technique that averages recent cable modem power measurements.

33. The computer program product of claim 32, wherein the instructions for adjusting the cable modem power based upon the first technique comprise instructions for:

(i) determining a difference between an actual power and an expected power of an upstream signal from the cable modem; and (ii) instructing the cable modem to adjust its power based upon the difference.

34. The computer program product of claim 32, wherein the program instructions for adjusting the cable modem power based upon a second technique comprises instructions for;

(i) calculating a power adjustment based upon a plurality of recent different between actual power and expected power of upstream signals from the cable modem; and (ii) instructing the cable modem to adjust its power based upon the calculated power adjustment.

35. The computer program product of claim 32, further comprising program instructions for:

after instructing the cable modem to adjust its power, determining that the upstream signs from the cable modem contain less than the threshold level of noise or fluctuation; and returning to the first technique for adjusting the cable modem power.

36. The method of claim 1, wherein instructing the cable modem to adjust its power comprises sending instructions from the headend to the cable modem.

37. The method of claim 11, further comprising sending instructions from the headend to the cable modem to adjust the cable modem power by amount determined using the second technique.

38. The method of claim 24, wherein instructing the cable modem to adjust its frequency comprises sending instructions from the headend to the cable modem.

39. The computer program product of claim 27, wherein instructions for instructing the cable modem to adjust its power comprises instructions for sending instructions from the head-end to the cable modem.

40. The computer program product of claim 32, wherein the program instructions further comprise instructions for sending instructions from the headend to the cable modem to adjust the cable modem power by amount determined using the second technique.

41. Apparatus for adjusting the power of a cable modem on a cable network, the apparatus being located in a head-end of the cable network and comprising:

(a) means for determining, during execution of a ranging protocol in the cable network, that cable modem signals received at or proximate a head-end of the cable network fluctuate in power by more than a defined amount;

(b) means for instructing a power adjustment using a plurality of recent power measurements of signals taken over a plurality of ranging requests from the cable modem taken at or proximate the head-end of the cable network; and (c) means for instructing the cable modem, from the head end and during the ranging protocol, to adjust its power based upon the calculated power adjustment.

42. Apparatus for controlling the power at which a cable modem sends data upstream on a cable network, wherein at or proximate a cable network heads the cable network periodically determines the power of upstream signals from the cable modem, the apparatus comprising:

(a) means for adjusting the cable modem power, during execution of a ranging protocol in the cable network, by an amount calculated based on a first technique that does not average recent cable modem power measurements;

(b) means for determining that upstream signals from the cable modem contain more than a threshold level of noise or fluctuation; and (c) means for sending instructions for adjusting the cable modem power from the head-end and during the ranging protocol, by an amount calculated based upon a second technique that averages recent cable modems power measurements.

\* \* \* \* \*